Patented June 14, 1949

2,472,908

UNITED STATES PATENT OFFICE 2,472,908

PROCESS FOR TREATING A HYDROCARBON MIXTURE WHICH IS CONTAMINATED BY SMALL AMOUNTS OF ORGANIC FLUORINE COMPOUNDS

Carl B. Linn, Riverside, Ill., assignor to Universal Oil Products Company, Chicago, Ill., a corporation of Delaware No Drawing. Application September 26, 1947, Serial No. 776,424

6 Claims. (Cl. 260—683.4)

This invention relates to a process for treating a hydrocarbon or hydrocarbon mixture which is contaminated by small amounts of organic fluorine compounds to remove fluorine therefrom. More specifically, it relates to the use of a substantially anhydrous liquid complex of boron trifluoride as a treating agent for hydrocarbons produced synthetically in the presence of an active fluoride catalyst to remove small amounts of organically combined fluorine present in compounds admixed with the hydrocarbon or hydrocarbons.

The invention is particularly adapted to the treatment of hydrocarbons produced by the alkylation of isoparaffinic hydrocarbons with olefinic hydrocarbons or with alkyl fluorides using active fluoride catalysts including hydrogen fluoride or fluoride mixtures comprising essentially hydrogen fluoride and boron fluoride. The process is also applicable to the removal of alkyl fluorides from propane and butane fractions, the latter comprising particularly normal butane recovered from the gaseous products discharged from an alkylation plant in which a butane or pentane fraction is alkylated by propylene present in a propane-propylene fraction.

An object of this invention is to defluorinate a hydrocarbon or hydrocarbon mixture contaminated by relatively small amounts of organic fluorine compounds, particularly alkyl fluorides.

Another object of this invention is to dehydrofluorinate an isoparaffin alkylation product formed in the presence of an active fluoride catalyst.

A further object of this invention is to remove alkyl fluorides from hydrocarbon conversion products formed in the presence of an active fluoride catalyst.

A still further object of this invention is to remove alkyl fluorides from a fraction of normally gaseous paraffinic hydrocarbons recovered from the products formed in the alkylation of isobutane by olefins present in a $C_3$—$C_4$ hydrocarbon fraction.

Another object of this invention is to remove alkyl fluoride from a propane fraction recovered from the products formed in the alkylation of isobutane in the presence of hydrogen fluoride with a propane-propylene fraction containing a relatively small amount of ethylene.

One specific embodiment of the present invention comprises a process for treating hydrocarbon material containing as an impurity a relatively small percentage of organically combined fluorine to remove fluorine therefrom which comprises contacting said material with a substantially anhydrous liquid complex of boron trifluoride and an organic oxygen-containing compound at dehydrofluorinating conditions of temperature and pressure, and recovering the treated hydrocarbon material.

A further embodiment of the present invention comprises a process for treating hydrocarbon material containing as an impurity a relatively small percentage of organically combined fluorine to remove fluorine therefrom which comprises contacting said material with a complex comprising a major proportion by weight of boron trifluoride and a minor proportion by weight of an organic-oxygen-containing compound, and recovering the treated hydrocarbon material.

Another embodiment of the present invention comprises a process for treating hydrocarbons recovered from an alkylation process in which an isoparaffin is alkylated with an olefin in the presence of an active fluoride catalyst, by treating said hydrocarbons with a liquid comprising boron trifluoride and an organic oxygen-containing compound at dehydrofluorinating conditions of temperature, pressure, and time, and recovering the treated hydrocarbons.

The alkylation of branched chain paraffinic hydrocarbons such as isobutane and isopentane with olefinic hydrocarbons, particularly the olefinic hydrocarbons present in cracked gases, produces saturated liquid hydrocarbons utilizable as constituents of gasoline of high antiknock value. By this means relatively low boiling isoparaffinic hydrocarbons are alkylated with low boiling olefins and thereby converted into materials of higher boiling point and high antiknock value, such hydrocarbonaceous materials being particularly useful as components of aviation gasoline. The higher boiling hydrocarbons so formed from low boiling isoparaffins and olefins in the presence of an active fluoride catalyst including hydrogen fluoride, or mixtures of hydrogen fluoride and boron fluoride, frequently contain small amounts of organic fluorine compounds which are not readily removable by washing with caustic and water or by fractional distillation. These contaminating fluorine compounds which are thus present in hydrocarbon mixtures are possible due to the interaction of hydrogen fluoride with olefins to form alkyl fluorides. Some alkyl fluorides are more stable than others in the presence of active fluoride catalysts. Thus, ethyl fluoride appears to be more stable than some of the higher molecular weight alkyl fluorides in an alkylation reaction mixture and is not converted completely into alkylation product but admixes with the hydrocarbon products. Some higher boiling alkyl fluorides and other organic fluorine compounds may also remain in hydrocarbon alkylation products. Because of its high stability, boiling point, and the fact that it forms with propane an azeotropic mixture boiling at −47° C., ethyl fluoride is found in the propane fraction recovered from an alkylation process utilizing a propane-propylene fraction as an olefinic charging stock. Such propane-propylene charging stocks frequently contain ethylene in small amounts and form ethyl fluoride by the addition of hydrogen fluoride in this olefin of lowest molecular weight.

Boron fluoride assists hydrogen fluoride in catalyzing the alkylation of an isoparaffin by ethylene and higher olefins, but in these cases the alkylation product also contains small quantities of organic fluorides as do those formed similarly in the presence of hydrogen fluoride from an isoparaffin and an olefin of higher molecular weight than ethylene.

Although the fluorine content of the hydrocarbon product of gasoline boiling range resulting from an alkylation treatment is rarely very high, the presence of fluorine is undesirable both from the standpoint that the combustion products of such a fuel are corrosive, as well as the fact that the antiknock value of the gasoline, generally expressed by the term "octane number," is reduced considerably either when the gasoline is used as such, or when a small amount of an antidetonating agent such as lead tetraethyl is added thereto. Thus it may be shown that gasoline fractions containing 0.1% by weight of fluorine have inferior antiknock properties, particularly as concerns their response to lead tetraethyl as compared to the otherwise same material which contains substantially no fluorine compounds. The present invention offers a method for reducing the fluorine content of the hydrocarbon alkylation product to an amount where it is no longer objectionable.

Also, propane and normal butane which are not alkylated during the alkylation treatment of an isoparaffin with a $C_3$ or a $C_4$ hydrocarbon fraction are recovered from alkylation products and used as fuels and for various industrial uses such as in the production of hydrogen. Such recovered propane and normal butane fractions are sometimes contaminated by ethyl fluoride and other organic fluorine compounds formed incidentally in the alkylation treatment and it is desirable that these propane and butane fractions be freed from fluorine compounds before being utilized as above indicated.

It is much more difficult to dehydrofluorinate ethyl fluoride than the other alkyl fluorides which may be encountered in products of the hydrogen fluoride alkylation process. It has been observed that alkylation plants which charge a propane-propylene feed stock to the alkylation reactor produce ethyl fluoride from the ethylene which usually contaminates the $C_3$ feed stock. This ethyl fluoride tends to go through the plant unchanged and finally appears in the propane fraction recovered from the effluent gases. The methods used heretofore for removing organic fluorine compounds from alkylate such as passage through heated contactors containing bauxite or aluminum do not cause the dehydrofluorination of ethyl fluoride and consequently are ineffective for producing a propane fraction substantially free from fluorine. My process, however, does defluorinate not only alkylate but also propane and makes it possible to produce a substantially fluorine free propane fraction.

As indicated above, ethyl fluoride is more stable than the higher alkyl fluorides encountered in the products of the hydrogen fluoride alkylation process. Possibly one reason for this difference in stability of the alkyl fluorides is the fact that ethyl fluoride is a primary alkyl fluoride, while the alkyl fluorides produced from propylene and higher olefins are either secondary or tertiary alkyl fluorides.

Liquid complexes of boron trifluoride and organic-oxygen-containing compounds used as treating agents in my process to remove organically combined fluorine from hydrocarbons contaminated thereby may be prepared by absorbing boron trifluoride in an organic compound selected from the group consisting of alcohols, ethers, carbonyl compounds, carboxylic acids, their anhydrides and esters.

Simple alcohols and particularly alkanols form complexes with boron trifluoride, said complexes being referred to as coordination compounds. Such compounds are formed presumably because the boron atom of boron trifluoride possesses only six electrons in its outer shell and is capable of combining with an atom having an unshared pair of electrons to form a coordinate covalent (semipolar) bond. Thus boron trifluoride combines with methyl ether to form an etherate:

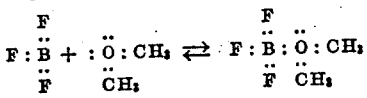

A boron trifluoride dialcoholate ($BF_3 \cdot 2ROH$) is formed by the addition of one molecular proportion of boron trifluoride to two molecular proportions of an alcohol. This reaction takes place rapidly with considerable evolution of heat. The resultant dialcoholates are colorless liquids which do not fume in moist air and which (in the case of the low molecular weight primary alkanols) may be distilled at reduced pressure without decomposition. However, with the exception of methyl and ethyl alcohol-boron fluoride complexes these alcoholates of $BF_3$ decompose slowly to hydrocarbon oils on standing. The di-secondary alcoholates are less stable and decompose rapidly on heating to give olefin and hydrocarbon polymers. The monoalcoholates are prepared by the further addition of boron fluoride to the dialcoholate. This reaction is only slightly exothermic, and is rather slow. The monoalcoholates are colorless fuming liquids which, with the exception of the monomethanolate and the monoethanolate decompose rapidly at room temperature to form hydrocarbon polymers. The alcoholates appear to be highly ionized and behave as strong acids.

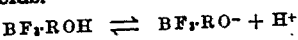

Boron trifluoride also forms addition compounds with ethers and particularly with ethers of low molecular weight. These compounds are dissociated considerably at room temperature, as indicated by the equation:

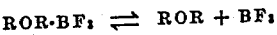

and the dissociation becomes complete at the so-called boiling point at which the combined partial pressures of the components equal one atmosphere, this generally being in excess of about 50° C. and with some ethers being above 100° C.

Carbonyl compounds, including aldehydes, ketones and acid halides are also capable of forming coordination compounds with boron trifluoride, said complexes being liquids effective as defluorination agents in this process particularly at treating temperatures below about 50° C.

Also monocarboxylic acids also form coordination compounds with boron trifluoride in which one molecular proportion of boron trifluoride is combined with one or two molecular proportions of the carboxylic acid. In forming the latter compound from one molecular proportion of boron trifluoride and two molecular proportions of a carboxylic acid which may be indicated as $RCO_2H$, the reaction is highly exothermic and stable, colorless liquids are formed which fume slightly in moist air. These colorless liquids are soluble in ether and in nitrobenzene. Upon addition of another molecular proportion of boron trifluoride to the $BF_3 \cdot 2RCO_2H$ complexes, the other coordination compound is formed, namely

$BF_3 \cdot RCO_2H$

The (1:1) compounds are strong acids in the form of low melting fuming solids, which lose about one-half of their boron trifluoride on distillation at subatmospheric pressure to give (1:2) compounds.

The stability of boron trifluoride-organic acid addition complexes toward dissociation is decreased considerably by the presence in the molecule of groups which attract electrons. Thus boron trifluoride-monochloroacetic acid complex is less stable than that with acetic acid but is more stable than the dichloroacetic acid compound. Similarly, crotonic acid-boron trifluoride loses its boron trifluoride at a lower temperature than the butyric acid compound. The addition compounds with dibasic acids such as oxalic, succinic and maleic acids are not very stable but may be prepared by bubbling boron trifluoride through a suspension of the dibasic acid in a boron fluoride-ether mixture.

A large variety of esters of carboxylic acids adsorb an equal molecular proportion of boron trifluoride to form addition compounds. The boron trifluoride addition compounds of the methyl and ethyl esters of monobasic aliphatic acids appear to be quite stable and can be distilled at atmospheric pressure. Anhydrides of carboxylic acids such as acetic anhydrides, propionic anhydrides, and butyric anhydrides form complexes with boron trifluoride which decompose when warmed with water to form ketones.

According to the process of the present invention, hydrocarbon material contaminated by organic fluorine compounds is freed from a substantial proportion of such organically combined fluorine by treatment with a boron trifluoride-organic oxygen-containing complex at a temperature of from about −50° to about 100° C. and preferably at a temperature of from about 0° to about 50° C. The process is carried out at atmospheric pressure or at a superatmospheric pressure sufficient to maintain the fluorine-containing hydrocarbon or hydrocarbon mixture in substantially liquid phase.

The treatment of the hydrocarbon or hydrocarbon mixture with a boron trifluoride-organic complex is effected in either batch or continuous types of treatment. In batch type operation, one volume of the hydrocarbon or hydrocarbon mixture contaminated by organic fluorine compounds is agitated with from about 0.1 to about 100 volumes of boron trifluoride-organic complex at a temperature of from about −50° C. to about 100° C. and at a pressure sufficient to maintain liquid phase operation for a time generally of from about 0.1 to about 3 hours. In the case of a propane fraction, the maximum treating temperature is about 90° C. in order to effect the defluorination treatment in liquid phase. The resultant reaction mixture is then separated into a liquid boron trifluoride-organic complex layer and a hydrocarbon layer and the latter is washed, dried, and distilled or otherwise treated to recover the desired hydrocarbon or hydrocarbons substantially free from fluorine-containing compounds, while the used liquid complex is returned to the reactor for further use in treating an additional quantity of the hydrocarbon charging stock.

Continuous treatment of a hydrocarbon containing organically combined fluorine is effected by passing said hydrocarbon and a proportioned amount of a boron trifluoride-organic complex through a baffled mixer or other suitable type of contacting equipment in which the hydrocarbon and boron trifluoride-organic complex are contacted at the aforementioned conditions of temperature and pressure for a time sufficient to effect the removal of a substantial proportion of the fluorine from the hydrocarbon material. From this treating equipment the mixture of hydrocarbon material and the boron trifluoride-organic complex is directed to a separator from which the hydrocarbon layer is removed and then washed, dried, and distilled or otherwise treated to recover the desired hydrocarbons substantially free from fluorine-containing compounds. The used complex is then withdrawn from the separator and at least a portion thereof is recycled to further use in treating an additional quantity of the mentioned charging stock.

The following example is given to show results obtained in the operation of the process but these data are not to be construed to limit unduly the broad scope of the invention.

A turbomixer of one liter capacity containing 98 grams of boron trifluoride monomethanolate was used to treat 100 grams of propane containing fluoride contaminants for two hours at a temperature of 20° C. and at atmospheric pressure. The fluorine content of the propane charging stock was thereby reduced from 0.05% by weight of fluorine to 0.01% by weight of fluorine.

I claim as my invention:

1. A process for treating a hydrocarbon material containing as an impurity a relatively small percentage of organically combined fluorine to remove fluorine therefrom which comprises contacting said hydrocarbon material at defluorinating conditions of temperature and pressure with a substantially anhydrous liquid complex of boron trifluoride and an oxygen-containing organic compound selected from the group consisting of alcohols, ethers, carbonyl compounds, carboxylic acids, their anhydrides and esters, and recovering the treated hydrocarbon material.

2. A process for treating a hydrocarbon material containing as an impurity a relatively small percentage of organically combined fluorine and produced by catalytic alkylation of an isoparaffinic hydrocarbon with an olefinic hydrocarbon in the presence of an active fluoride catalyst which comprises treating said hydrocarbon material at defluorinating conditions of temperature and pressure with a liquid complex of boron trifluoride and an oxygen-containing organic compound selected from the group consisting of alcohols, ethers, carbonyl compounds, carboxylic acids, their anhydrides and esters, and recovering the treated hydrocarbon material.

3. A process for treating a hydrocarbon material containing as an impurity a relatively small percentage of organically combined fluorine to remove therefrom which comprises contacting said hydrocarbon material at a temperature of from about −50° to about 100° C. with a liquid complex of boron trifluoride and an oxygen-containing organic compound selected from the group consisting of alcohols, ethers, carbonyl compounds, carboxylic acids, their anhydrides and esters, and recovering the treated hydrocarbon material.

4. A process for treating a hydrocarbon material containing as an impurity a relatively small percentage of organically combined fluorine to remove fluorine therefrom which comprises contacting said hydrocarbon material with a liquid complex of boron trifluoride and an oxygen-containing organic compound selected from the group consisting of alcohols, ethers, carbonyl compounds, carboxylic acids, their anhydrides and esters at a temperature of from about −50° to about 100° C., and at a pressure sufficient to maintain the hydrocarbon material in substantially liquid phase and recovering the treated hydrocarbon material.

5. A process which comprises alkylating an isoparaffinic hydrocarbon with an olefinic fraction containing propane and ethylene in the presence of an active fluoride alkylating catalyst at alkylating conditions, separating from the resultant alkylation products an unconverted propane fraction containing ethyl fluoride formed during the alkylation step, contacting said propane fraction at defluorinating conditions with a liquid complex of boron trifluoride and an oxygen-containing organic compound selected from the group consisting of alcohols, ethers, carbonyl compounds, carboxylic acids, their anhydrides and esters, and recovering the treated propane fraction.

6. The process defined in claim 5 further characterized in that said propane fraction is treated with said complex at a temperature of from −50° to about 90° C. and at a pressure sufficient to maintain the hydrocarbon material in substantially liquid phase.

CARL B. LINN.

REFERENCES CITED

The following references are of record in the file of this patent:

UNITED STATES PATENTS

| Number | Name | Date |
|---|---|---|
| 2,408,753 | Burk | Oct. 8, 1946 |
| 2,425,839 | Schulze et al. | Aug. 19, 1947 |
| 2,428,754 | Linn | Oct. 7, 1947 |